(12) United States Patent
Garland et al.

(10) Patent No.: US 8,499,988 B2
(45) Date of Patent: Aug. 6, 2013

(54) ROOF RACK CROSSBAR

(75) Inventors: Travis S. Garland, Milford, MI (US); Michael Ford, West Bloomfield, MI (US); Scott Aaron Ford, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 208 days.

(21) Appl. No.: 13/239,017

(22) Filed: Sep. 21, 2011

(65) Prior Publication Data

US 2013/0068810 A1   Mar. 21, 2013

(51) Int. Cl.
*B60R 9/045* (2006.01)

(52) U.S. Cl.
USPC .......................................... 224/321; 224/322

(58) Field of Classification Search
USPC .................. 224/309, 321, 322, 325
See application file for complete search history.

(56) References Cited

U.S. PATENT DOCUMENTS

| | | | | |
|---|---|---|---|---|
| 3,677,195 A | * | 7/1972 | Prete, Jr. ........................ | 410/105 |
| 4,911,348 A | * | 3/1990 | Rasor et al. .................... | 224/321 |
| 5,004,139 A | * | 4/1991 | Storm et al. ................... | 224/324 |
| 5,385,285 A | | 1/1995 | Cucheran et al. | |
| 5,845,829 A | | 12/1998 | Stapleton | |
| 6,179,179 B1 | * | 1/2001 | Potter et al. ................... | 224/321 |
| 6,722,541 B1 | * | 4/2004 | Aftanas et al. ................ | 224/403 |
| 6,997,657 B1 | * | 2/2006 | Saward ........................ | 410/106 |
| 7,090,103 B2 | | 8/2006 | Aftanas et al. | |
| 7,419,074 B2 | * | 9/2008 | Kamiya et al. ................ | 224/321 |
| 7,766,200 B2 | | 8/2010 | Park et al. | |
| 8,016,171 B2 | * | 9/2011 | Aftanas ........................ | 224/315 |
| 8,056,782 B2 | * | 11/2011 | Lim et al. ...................... | 224/321 |
| 2009/0200349 A1 | | 8/2009 | Lim et al. | |
| 2010/0096422 A1 | | 4/2010 | Kim et al. | |

FOREIGN PATENT DOCUMENTS

WO  WO 2005035315 A1 *  4/2005
WO     2006130079 A1     7/2006

OTHER PUBLICATIONS

Chicagoland Canoe Base, "Roof Racks from Yakima," http://ww.chicagolandcanoebase.com/RoofRacks.html, May 5, 2011, 4 pages, Chicago, Illinois.

* cited by examiner

*Primary Examiner* — Justin Larson
(74) *Attorney, Agent, or Firm* — Gregory P. Brown; Price Heneveld LLP

(57) ABSTRACT

A vehicle roof rack assembly comprises a pair of rails defining retention channels therein. A locking slot is disposed on an inboard surface of the rails and is in communication with the retention channels. The rook rack assembly further comprises a crossbar having a rotatable locking cam with retention tabs. The locking cam is designed to frictionally engage the locking slot during rotation and the retention tabs are adapted to extend into the retention channels, thereby securing the crossbar to the rails.

19 Claims, 4 Drawing Sheets

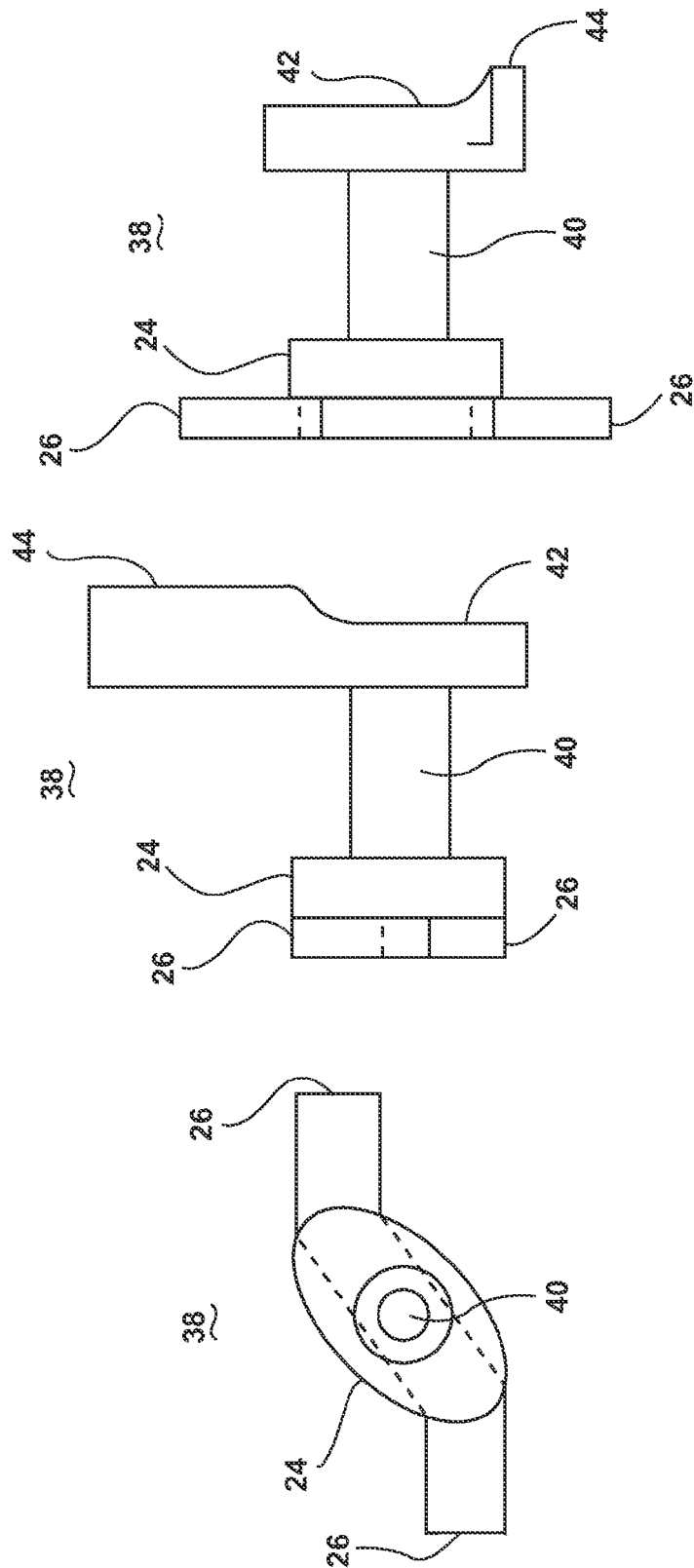

ROOF RACK CROSSBAR

FIELD OF THE INVENTION

The present invention generally relates to an automotive roof rack system, and more particularly to system for securing a crossbar of a roof rack without the need for secondary tools.

BACKGROUND OF THE INVENTION

Roof racks are generally secured to the roof of a vehicle and are effective to store and transport objects on the roof of the vehicle without interfering with passenger occupancy and without the limitations of common trunk designs. Roof racks typically include several elongated members or rails, which may be selectively and removably connected to the vehicle to form a frame or support structure. Items such as skis, bikes, luggage, and other large (and small) items can be tied down, or otherwise secured, to the roof rack by conventional fastening means, such as bungee cords.

Because of their location, the roof rack assemblies are difficult to access, even for tall individuals. Adjusting the position of the rails can be difficult, and affixing the rails by the fasteners traditionally used often requires the use of a secondary tool, such as a screwdriver or electric drill.

SUMMARY OF THE INVENTION

A vehicle roof rack assembly comprises a pair of rails defining retention channels therein.

A locking slot is disposed on an inboard surface of the rails and is in communication with the retention channels. The rook rack assembly further comprises a crossbar having a rotatable locking cam with retention tabs. The locking cam is designed to frictionally engage the locking slot during rotation and the retention tabs are adapted to extend into the retention channels, thereby securing the crossbar to the rails.

In another embodiment of the invention, a vehicle roof rack assembly comprises a pair of elongate rails disposed on an outer roof surface; each rail comprises a locking slot on an inboard surface thereof. A crossbar has a pair of rotatable locking cams with retention tabs adapted for engagement with the locking slot.

In yet another embodiment of the invention, a vehicle roof rack assembly comprises a pair of elongate rails defining retention channels and disposed on an outer roof surface. Each rail comprises a pair of locking slots on an inboard surface thereof. The roof rack assembly further comprises a crossbar having a pair of rotatable locking cams with retention tabs adapted for engagement with the locking slot. The locking cams are designed to frictionally engage the locking slots during rotation and the retention tabs are adapted to extend into the retention channels, thereby securing the crossbar to the rails.

In still another embodiment of the invention, a vehicle has an outer roof panel with an automotive roof rack installed thereupon. The roof rack includes longitudinally extending side rails and laterally extending crossbars, which are mounted between the side rails. The side rails are hollow rails, which define a retention channel therein. Each side rail comprises a plurality of locking slots disposed on an inboard surface, the locking slots being in communication with the retention channel. The crossbar has a rotatable locking cam with retention tabs. The locking cam is designed to frictionally engage the locking slot during rotation, and the retention tabs are adapted to extend into the retention channel so as to secure the crossbar to the side rails.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a side elevational view of the locking device of the roof rack of FIG. 1;

FIG. 4 is a front elevational view of the locking device of the roof rack of FIG. 1;

FIG. 5 is a top elevational view of the locking device of the roof rack of FIG. 1;

DETAILED DESCRIPTION OF THE PREFERRED EMBODIMENTS

Figure 1:
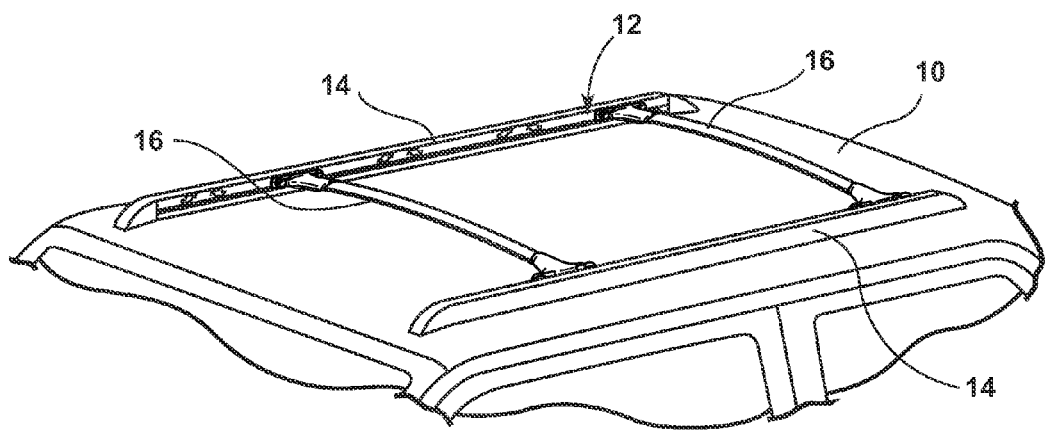
FIG. 1 is a partial top perspective view of a roof of an automotive vehicle having a roof rack of the present invention.
Figure 2:
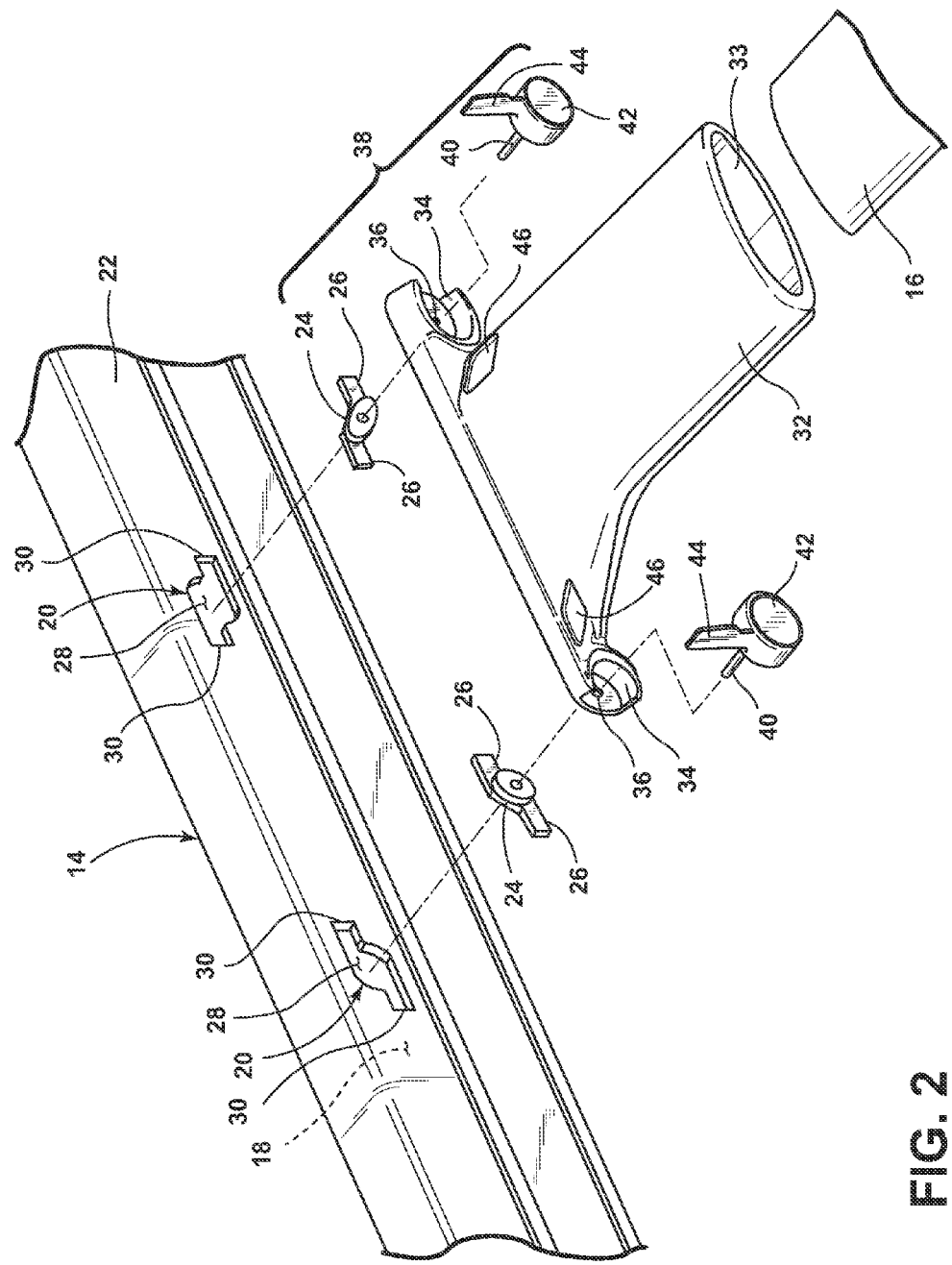
FIG. 2 is a top perspective exploded detail view of a side rail, crossbar, and locking device of the roof rack of FIG. 1.

For purposes of description herein, the terms "upper," "lower," "right," "left," "rear," "front," "vertical," "horizontal," "inboard," "outboard," and derivatives thereof shall relate to the vehicle as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1 and 2, a vehicle has an outer roof panel 10 with an automotive roof rack 12 installed thereupon. The roof rack 12 includes longitudinally extending side rails 14 and laterally extending crossbars 16, which are mounted between the side rails 14. The side rails 14 are conventional, hollow rails, which define a retention channel 18 therein. Each side rail 14 comprises a plurality of locking slots 20 disposed on an inboard surface 22, the locking slots 20 being in communication with the retention channel 18. The crossbar 16 has a rotatable locking cam 24 with retention tabs 26. The locking cam 24 is designed to frictionally engage the locking slot 20 during rotation, and the retention tabs 26 are adapted to extend into the retention channel 18 thereby securing the crossbar 16 to the side rails 14.

The side rail 14 has a plurality of spaced locking slots 20 defined in the side rail 14 along an inside wall thereof. Each locking slot 20 comprises a center opening 28 and a pair of opposed and offset retention slots 30. The center opening 28 and retentions slots 30 are arranged such that together they form a substantially s-shaped cutout. The locking slots 20 are arranged in spaced pairs, and are oriented in mirror image relationship. Thus, each pair of locking slots 20 includes an s-shaped locking slot 20 and a mirror image s-shaped locking slot 20. The side rail 14 can have multiple pairs of locking slots 20, such that multiple crossbars 16 can be utilized with the roof rack 12. In the illustrated embodiment of FIG. 1, five pairs of locking slots 20 are depicted. However, it is contemplated that any number of pairs may be present on the side rail 14. It will be understood that the side rails 14 will have an equal number of locking slots 20 substantially laterally aligned to provide substantially lateral fixation of the crossbar 16. The side rails 14 are manufactured and/or formed from a strong and durable material such as aluminum, steel, plastic, or any other suitable material.

A shroud 32 is disposed at each end of the crossbar 16. The shroud 32 is slidably engaged with the crossbar 16 such that the shroud 32 can be shifted inboard and outboard at least a small distance along the crossbar 16. The shroud includes a mouth 33 adapted to receive an end of the crossbar 16. However, alternatively, it is also contemplated that a portion of the shroud 32 could be received in the crossbar 16. The shroud 32 comprises two pockets 34, each pocket 34 having a through hole 36.

Referring to FIGS. 2-5, a locking device 38 comprises the locking cam 24, the retention tabs 26, a shaft 40, and a lever 42. The locking cam 24 and retention tabs 26 are affixed to the shaft 40, the retention tabs 26 positioned outboard the locking cam 24. The lever 42 is also affixed to the shaft 40. The lever 42 is spaced from the locking cam 24, and positioned inboard therefrom. In other words, the components of the locking device 38 are arranged in the following order, moving outboard from the center of the vehicle, lever 42, shaft 40, locking cam 24, and then retention tabs 26.

The locking device 38 is rotatably affixed to the shroud 32. The shaft 40 passes through the through hole 36 and the lever 42 is seated within the pocket 34. The locking cam 24 and retention tabs 26 extend out from the shroud 32. Additionally, the lever 42 includes an integral finger grip 44, so as to enable a user to easily grip and rotate the locking device 38.

The geometry of the locking slot 20 is substantially complementary to the geometry of the retention tabs 26 and locking cam 24. As such, in the unlocked position, illustrated in FIG. 6, the retention tabs 26 and locking cam 24 are aligned with the center opening 28 and retention slots 30 which allows for easy installation and removal of the retention tabs 26 and locking cam 24 into the retention slots 30 and center opening 28, respectively. In the locked position, illustrated in FIG. 7, the retention tabs 26 and locking cam 24 are not aligned with the center opening 28 and retention slots 30. Consequently, in the locked position, the retention tabs 26 and locking cam 24 and therefore the shroud 32 and crossbar 16 are held in secure engagement with the side rail 14. The locked position is rotated approximately ninety degrees (90°), clockwise or counter-clockwise, from the unlocked position.

Figure 6:
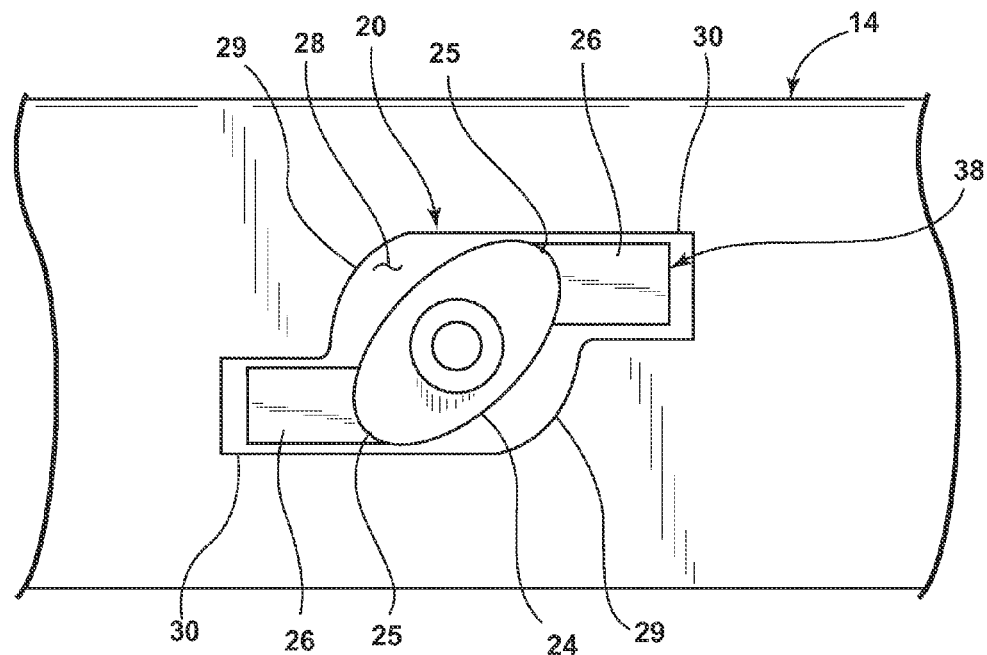
FIG. 6 is a side elevational view of the left locking device and side rail shown in FIG. 2, illustrating an unlocked position.
Figure 7:
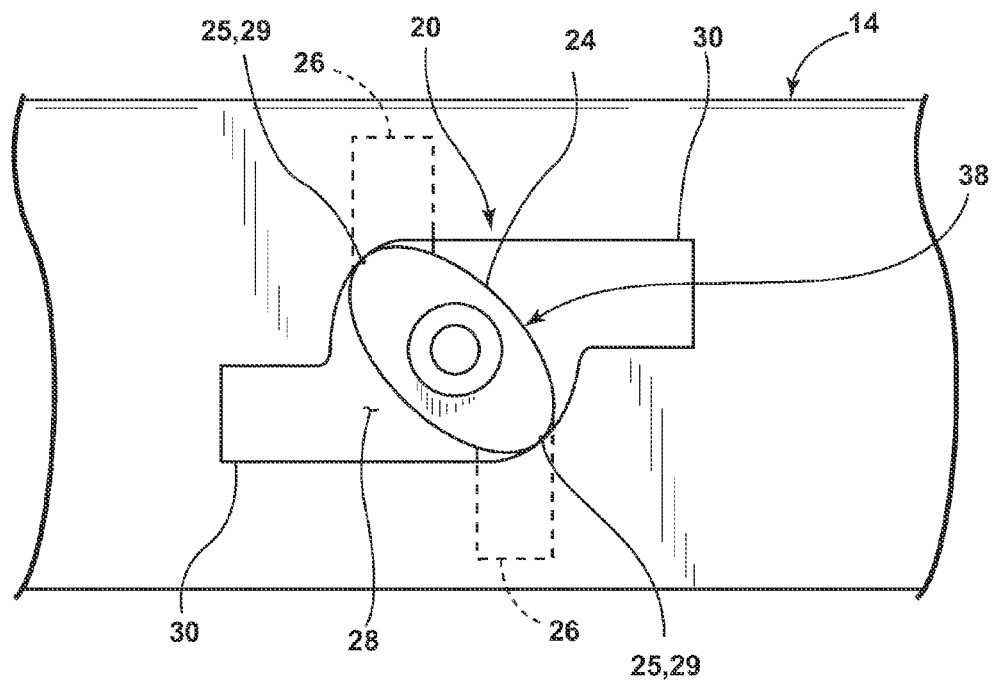
FIG. 7 is a side elevational view of the left locking device and side rail shown in FIG. 2, illustrating a locked position.

To removably connect the crossbar 16 between the side rails 14, the user aligns the locking device 38 with the locking slot 20. The user then slides the shroud 32 over the crossbar 16 to increase the distance spanned by the shroud 32 and crossbar 16 until the retention tabs 26 can be inserted into the retention slots 30, as shown in the unlocked position of FIG. 6. To secure the crossbar 16 to the side rail 14, the user simply rotates the lever 42 of the locking device 38 approximately ninety degrees (90°) as discussed above. Rotating the lever 42 rotates the shaft 40, which also rotates the locking cam 24 and retention tabs 26. It should be noted that the locking device 38 illustrated in FIGS. 6 and 7 depicts the left locking device shown in FIG. 2. As shown, the left locking device 38 is rotated ninety degrees (90°) clockwise. A person having ordinary skill in the art will appreciate and understand that the right locking device 38 shown in FIG. 2 is rotated ninety degrees (90°) counter-clockwise to secure the right locking device 38 to the side rail 14.

The locking cam 24 is designed to frictionally engage the locking slot 20 during rotation, as shown in the locked position of FIG. 7. In the locked position, the points along the major axis of the substantially elliptically shaped locking cam 24, referred to as points 25, frictionally engage a curved wall 29 of the locking slot 20. The geometries of the locking cam 24 and curved wall 29 are designed such that rotation of the locking cam 24 past a desired point is prevented. More specifically, the arc of the curved wall 29 transitions from a size larger than the length of the locking cam 24 measured at its major axis to a size that is less than the length of the locking cam 24 measured at the major axis of the locking cam. Thus the locking cam 24 can only rotate so far. Further, the interface between the points 25 and the curved walls 29 are meant to be a friction fit, such that the locking device 38 is maintained in the locked position. Additionally, the retention tabs 26 are adapted to extend into the retention channel 18 and are retained by the inboard surface 22. The retention tabs 26, when rotated to the locked position, prevent the locking device 38 from being removed or pulled out from the side rails 14.

This method of affixing the crossbar 16 between the side rails 14 is repeated for each of the locking devices 38 on each end of the crossbar 16, and for each crossbar 16 used on the roof rack 12. As described above, the locking slots 20 are arranged in mirror image relationship, so one locking device 38 rotates clockwise, while the other locking device 38 rotates counter-clockwise. This method of installation is carried out on both sides of the crossbar 16. To remove the crossbar 16 from the side rails 14, this method is simply reversed. To aid in the unlocking of the locking devices 38, a finger recess 46 is provided in the shroud 32 to enable a user to insert their finger under the finger grip 44 when the lever 42 is lying close to the shroud 32 when in the locked position.

The roof rack 12 of the present invention offers a facile means of securing a crossbar 16 between side rails 14. The locking device 38 advantageously requires no secondary tools to secure the crossbar to the side rails 14. Additionally, the multiple pairs of locking slots 20 enable a customizable configuration of the crossbars 16 and roof rack 12 to provide optimized spacing for various objects to be mounted to the vehicle. The crossbars 16 can be easily moved and positionally adjusted along the surface of the roof to provide the desired support and structure to tie an object down to the roof rack 12 using traditional bungee cords, rope, or the like.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle roof rack assembly comprising:
a pair of rails defining retention channels;
a locking slot disposed on an inboard surface of the rails in communication with the retention channels; and
a crossbar having a rotatable locking cam with retention tabs, wherein the locking cam is designed to frictionally engage the locking slot during rotation and the retention tabs are adapted to extend into the retention channels, thereby securing the crossbar to the rails.

2. The vehicle roof rack assembly of claim 1, wherein the rails comprise two or more locking slots oriented in mirror image relationship.

3. The vehicle roof rack assembly of claim 1, wherein the crossbar comprises a shroud slidably mounted to each end of the crossbar.

4. The vehicle roof rack assembly of claim 3, wherein the crossbar comprises two locking cams with retention tabs.

5. The vehicle roof rack assembly of claim 4, wherein each locking cam further comprises a lever coupled with a shaft.

6. The vehicle roof rack assembly of claim 5, wherein the retention tabs, locking cam, the lever, and the shaft are rotatably mounted to the shroud.

7. The roof rack assembly of claim 6, wherein the retention tabs, locking cam, and lever are coupled with the shaft, such that rotating the lever rotates the locking cam and retention tabs.

8. A vehicle roof rack assembly comprising:
   a pair of elongate rails disposed on an outer roof surface, each rail comprising a locking slot on an inboard surface thereof;
   a crossbar having a pair of rotatable locking cams with retention tabs adapted for engagement with the locking slot; wherein the locking slot comprises a center opening and a pair of opposed and offset retention slots, the locking slot having a geometry that is substantially complementary to the retention tabs and locking cam.

9. The roof rack assembly of claim 8, wherein the rails comprise two or more locking slots oriented in mirror image relationship.

10. The roof rack assembly of claim 8, wherein each locking cam further comprises a lever coupled with a shaft.

11. The roof rack assembly of claim 8, wherein the retention tabs, locking cam, and lever are coupled with the shaft, such that rotating the lever rotates the locking cam and retention tabs.

12. The roof rack assembly of claim 8, wherein the retention tabs and locking cam are aligned with the center opening and retention slots of the locking slot when in the unlocked position, and wherein the retention tabs and locking cam are not aligned with the center opening and retention slots of the locking slot when in the locked position.

13. A vehicle roof rack assembly comprising:
   a pair of elongate rails defining retention channels and disposed on an outer roof surface, each rail comprising a pair of locking slots on an inboard surface thereof; and
   a crossbar having a pair of rotatable locking cams with retention tabs adapted for engagement with the locking slot, wherein the locking cams are designed to frictionally engage the locking slots during rotation and the retention tabs are adapted to extend into the retention channels, thereby securing the crossbar to the rails.

14. The vehicle roof rack assembly of claim 13, wherein the locking slots are oriented in mirror image relationship.

15. The roof rack assembly of claim 13, wherein each locking cam further comprises a lever coupled with a shaft.

16. The roof rack assembly of claim 15, wherein the retention tabs, locking cam, and lever are rotatably coupled with the shaft, such that rotating the lever rotates the locking cam and retention tabs.

17. The roof rack assembly of claim 13, wherein the locking slot comprises a center opening and a pair of opposed and offset retention slots, the locking slot having a geometry that is substantially complementary to the retention tabs and locking cam.

18. The roof rack assembly of claim 17, wherein the retention tabs and locking cam are aligned with the center opening and retention slots of the locking slot when in the unlocked position, and wherein the retention tabs and locking cam are not aligned with the center opening and retention slots of the locking slot when in the locked position.

19. The roof rack assembly of claim 18, wherein the locking cams are rotated in the opposite direction when rotated between the locked and unlocked positions.

\* \* \* \* \*